United States Patent [19]
Sivulka

[11] 4,445,725
[45] May 1, 1984

[54] VEHICLE HYDRAULIC BRAKE SYSTEM AND APPARATUS

[75] Inventor: Gerald M. Sivulka, Ann Arbor, Mich.

[73] Assignee: Kelsey Hayes Company, Romulus, Mich.

[21] Appl. No.: 270,437

[22] Filed: Jun. 4, 1981

Related U.S. Application Data

[63] Continuation of Ser. No. 134,801, Apr. 11, 1980, abandoned.

[51] Int. Cl.$^3$ .............................................. B60T 8/22
[52] U.S. Cl. ................... 303/6 C; 188/195; 188/349; 303/22 R
[58] Field of Search ................. 303/6 C, 22 R, 22 A, 303/23 R, 23 A, 24 A, 24 C, 24 F, 24 R, 6 R; 188/195, 349, 353

[56] References Cited

U.S. PATENT DOCUMENTS

| | | | |
|---|---|---|---|
| 3,322,246 | 5/1967 | Noguchi | 188/353 X |
| 3,697,138 | 10/1972 | Marting | 303/6 C |
| 3,731,981 | 5/1973 | Bueler | 303/22 R |
| 3,768,868 | 10/1973 | Hirai et al. | 303/6 C |
| 3,802,750 | 4/1974 | Kawai | 303/22 R |
| 3,938,850 | 2/1976 | Pembleton et al. | 303/6 C X |
| 4,125,290 | 11/1978 | Reinecke et al. | 303/22 R |
| 4,223,955 | 9/1980 | Reinecke | 303/22 R |
| 4,247,154 | 1/1981 | Shoji et al. | 303/24 A |

FOREIGN PATENT DOCUMENTS

| | | | |
|---|---|---|---|
| 2532669 | 2/1977 | Fed. Rep. of Germany | 303/22 R |
| 2743202 | 9/1978 | Fed. Rep. of Germany | 303/22 R |

*Primary Examiner*—Douglas C. Butler
*Attorney, Agent, or Firm*—Ralph J. Skinkiss

[57] ABSTRACT

A hydraulic braking system is provided for vehicles which frequently experience variable loading conditions ranging from maximum to near minimum gross vehicle weights. The system comprises dual proportioning valves, hydraulically in series with one another, one valve includes a unique spring driven digital cam which, in response to compression of the vehicle suspension system, selects the desired master cylinder to brake pressure relationship for the vehicle load condition.

6 Claims, 14 Drawing Figures

VEHICLE HYDRAULIC BRAKE SYSTEM AND APPARATUS

This is a continuation of application Ser. No. 134,801, filed Apr. 11, 1980, now abandoned.

BACKGROUND OF THE INVENTION

The present invention relates to improvements in load sensing hydraulic brake pressure control apparatus for use in the hydraulic circuit between the master cylinder and the rear wheel brake cylinders. The apparatus is adapted for sensing variations in the distance between the vehicle chassis and the suspended axle shaft.

It is known that changes in vehicle loading cause changes in braking capability. For example, when a vehicle is fully loaded, the rear wheels will have nearly the same braking capability as the front wheels. However, when the vehicle is lightly loaded, the rear wheels may exhibit less braking capability than the front wheels. Thus the potential for premature rear wheel lock up is much greater when stopping the lightly loaded vehicle than when stopping the fully loaded vehicle. In order to compensate for the inherent imbalance between front and rear braking action, it has been customary in past years to provide a proportioning valve which restricts fluid communication to the rear wheel brake cylinders after a predetermined pressure level is generated. However, such proportioning valves represent a compromise between the desirable system characteristics for the full load condition and those for the light load condition. Thus the selected proportioning valve characteristic is neither suitable for the full load condition nor the light load condition. Many load sensing or vehicle height sensing valve mechanisms have heretofore been presented in the prior art however, they are unnecessarily complex or otherwise unsuitable for modern vehicle use. For example see U.S. Pat. Nos. 3,362,758; 3,503,657; 3,649,084; 3,684,329; 3,734,574; 3,768,876; 3,848,932; 4,150,855; 4,159,855.

The present invention relates to improvements in load responsive hydraulic brake pressure control apparatus which is placed in the hydraulic circuit upstream of the rear wheels and senses changes in the distance between the chassis and the axle of an automotive vehicle and controls the hydraulic pressure delivered from the master cylinder to the rear wheel brake cylinders in response to such changes.

SUMMARY OF THE INVENTION

The present invention provides for a first and second proportioning valve assembly hydraulically in series with each other. The first proportioning valve assembly being positioned downstream of the master cylinder and the second positioned between the first valve assembly and the vehicle rear brakes. The first proportioning valve produces an output pressure suitable for a vehicle under a full load condition. The second proportioning valve, which receives the first valve's output pressure as input pressure, acts to modify or proportion the pressure received from the first valve producing an output pressure suitable for a lightly loaded vehicle.

The second proportioning valve assembly is rigidly attached to the vehicle frame and includes a rotatable digital cam driven by mechanical linkage attached to the vehicle axle. As the vehicle is loaded compression of the suspension system reduces the distance between the vehicle frame and the axle. The mechanical linkage in response to the reduction in distance rotates the digital cam to a position whereby the second proportioning valve mechanism is disabled. Thus the output pressure of the first proportioning valve is passed undisturbed through the second proportioning valve assembly to the rear wheel brakes.

The digital cam is rotatingly seated upon an axial drive shaft so as to allow relative rotation therebetween. A torsional spring affixed to the digital cam has one leg anchored thereon and the other leg engaging a flat diametric camming surface provided in the drive shaft. Thus the digital cam is caused to rotate in concert with the drive shaft. However by reason of the torsion spring a unique drive mechanism is provided which accommodates relative motion between the vehicle frame and the axle during vehicle operation by permitting relative rotation between the cam and the driveshaft whenever rotation of the cam is restricted by the functional operation of the proportioning valve mechanism.

Although the load sensing proportioning valve assembly is herein described as being in series with a first proportioning valve assembly it is to be understood that the load sensing valve may be used alone in systems where the master cylinder output pressure is suitable, without an intervening proportional valve, for direct transmission to the vehicle brakes in the heavily loaded condition.

DETAILED DESCRIPTION OF THE INVENTION

Figure 1:
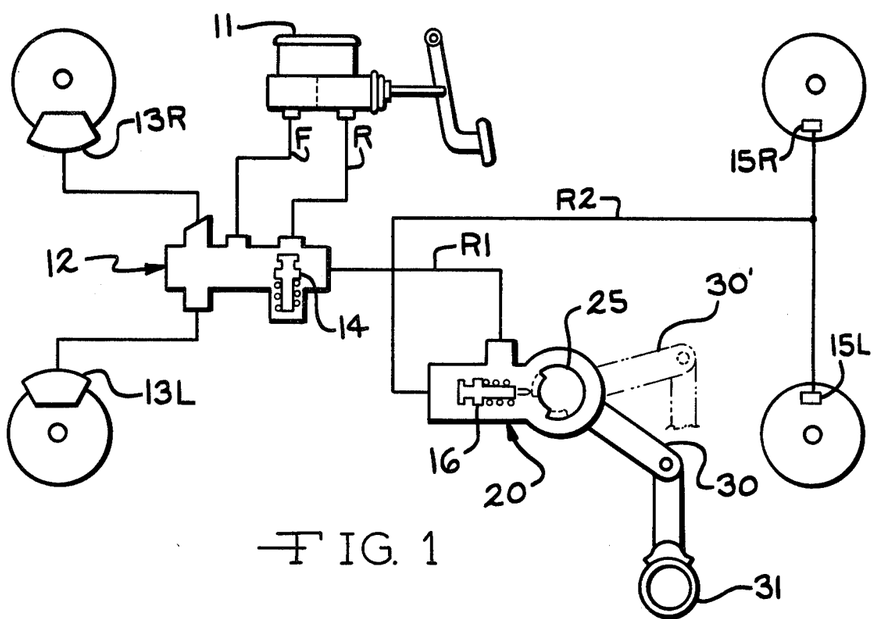
FIG. 1 is a schematic view of a hydraulic brake system incorporating a load sensing proportioning valve according to the present invention.

Referring to the drawings a vehicle hydraulic braking system embodying my invention is shown in FIG. 1. Master cylinder 11 provides brake activating hydraulic fluid pressure by means of conduit F to the vehicle front wheel brakes 13L and 13R first passing through a metering valve assembly, not shown, contained in combination valve 12. Conduit R similarly provides an independent source of brake activating hydraulic fluid pressure to a first proportioning valve assembly 14, shown schematically in combination valve 12, for supply to the vehicle rear wheel brakes 15L and 15R.

Figure 2:
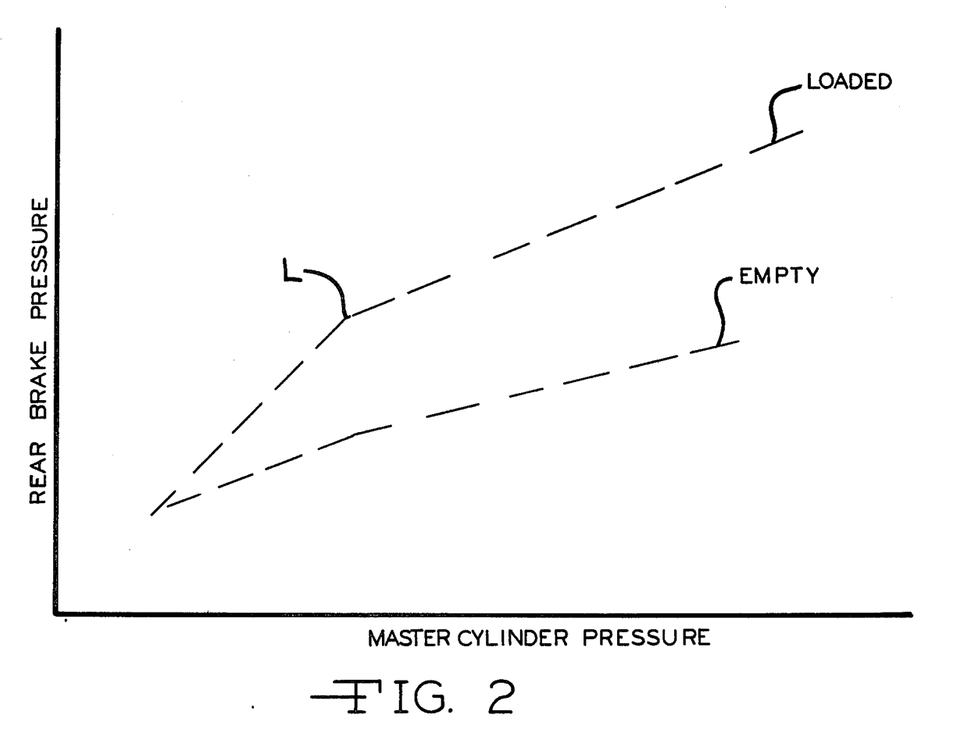
FIG. 2 is a graphical illustration of the performance of a brake proportioning system incorporating the present invention.

Proportioning valve 14 may be of any known design to the art, such as shown in U.S. Pat. No. 3,423,936, having a single split point relationship between input hydraulic pressure and output hydraulic pressure. In accord with the present invention proportioning valve 14 is designed to produce an output pressure relationship to input pressure as shown in FIG. 2 and identified as "LOADED". The split point at which valve 14 begins proportioning being indicated as point L. The curve identified as "LOADED" in FIG. 2 represents a master cylinder to rear brake pressure relationship acceptable for a vehicle loaded beyond a given mid-load condition and up to its full gross vehicle weight (GVW). The output hydraulic fluid pressure from proportioning valve 14 is transmitted to the vehicle rear brakes by conduits R1 and R2 passing through load sensing proportioning valve (LSPV) device 20.

LSPV 20 includes a second proportioning valve assembly 16, hereinafter described in greater detail, having a similar construction as that of proportioning valve assembly 14 contained in combination valve 12. Proportioning vavle assembly 16, when permitted to function, operates upon the output hydraulic pressure received from proportioning valve 14 such that the relationship between master cylinder pressure (input to proportioning valve 14) to rear brake pressure (output from proportioning valve 16) is represented by the curve identified as "EMPTY" in FIG. 2. The "EMPTY" curve shown in FIG. 2 represents a master cylinder to rear brake pressure relationship acceptable for a vehicle load condition falling below the selected mid-load condition.

A digital cam mechanism 25 is provided within LSPV 20 to selectively disable proportioning valve assembly 16 in the full open configuration when the vehicle is heavily loaded. Thus when the vehicle is loaded beyond the selected mid-load condition, proportioning valve 16 is disabled by action of digital cam 25 thereby permitting undisturbed, the transmission of hydraulic pressure therethrough and resulting in the desired "LOADED" pressure relationship shown in FIG. 2. However, when the vehicle is lightly loaded proportioning valves 14 and 16 function in series and produce a master cylinder pressure to rear brake pressure relationship as indicated by the curve "EMPTY" in FIG. 2.

Figure 3:
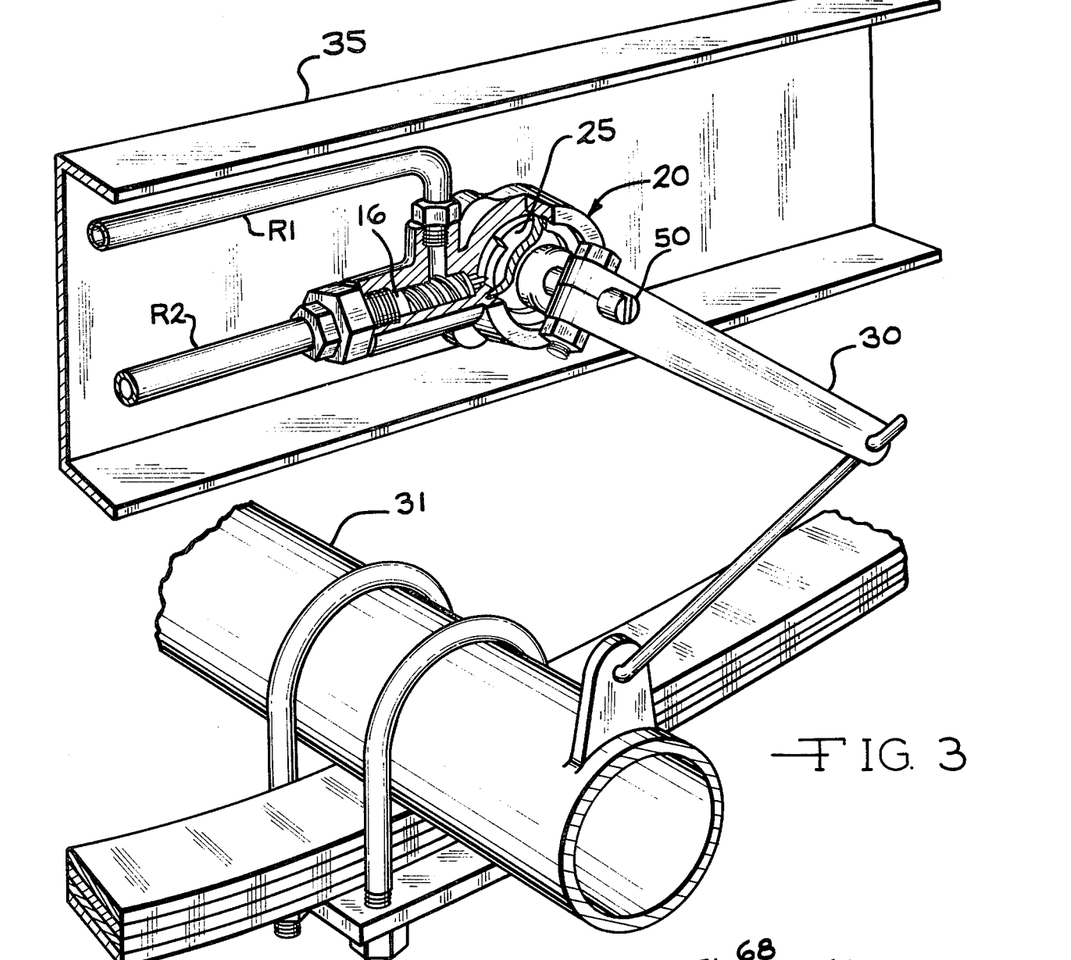
FIG. 3 pictorially depicts a typical vehicle installation of a load sensing proportioning valve embodying the present invention.

FIG. 3 pictorially depicts a typical vehicle installation of my load sensing proportioning valve. LSPV 20 is rigidly affixed to a non-suspended portion of the vehicle frame 35. Driveshaft 50 is firmly attached to linkage 30 so that as linkage 30 rotates driveshaft 50 rotates digital cam 25 by a drive mechanism hereinafter described in greater detail. Linkage 30 is firmly attached to the vehicle axle tube 31 or any other suitable element of the suspended portion of the rear wheel assembly.

Digital cam 25, through action of linkage 30 attached to vehicle axle 31 responds to compression or expansion of the vehicle suspension system (not shown). When the linkage is extended, as indicated by the numeral 30, the vehicle is lightly loaded and proportioning valve 16 is permitted to function. However, when the linkage is compressed, as indicated by numeral 30, the vehicle is heavily loaded and digital cam 25 is rotated into position so as to disable the operation of proportioning valve 16.

Referring to FIG. 3 proportioning valve assembly 16 as shown and described herein is merely representative of known proportioning valve mechanisms and does not represent a part of my invention. Recognizing that any known proportioning valve mechanism which may be modified to function as herein described is suitable for use with the present invention, the operation of proportioning valve assembly 16 will be described only to the extent necessary to understand its interrelationship with my digital cam and its function with respect to the overall brake hydraulic system.

Proportioning valve assembly 16 comprises valve piston 40 positioned axially within bore 45 and extends into bore 45a of smaller diameter which in turn opens into digital cam cavity 70. O-ring seal 47 is provided to hydraulically seal bore 45 from bore 45a thereby preventing the flow of hydraulic fluid into bore 45a. Piston 40 is provided with a pin like extension 48 projecting into bore 49. Piston 40 is permitted to axially translate within bore 45a so that pin 48 may project into the digital cam cavity 70 as will be described hereinafter.

Figure 5:
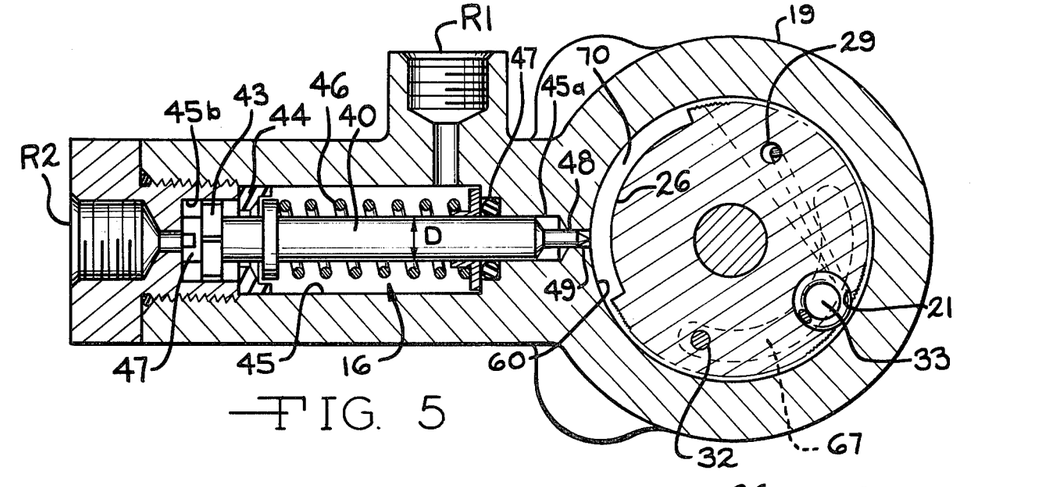
FIG. 5 is a cross-sectional view taken along line 5—5 in FIG. 4.
Figure 6:
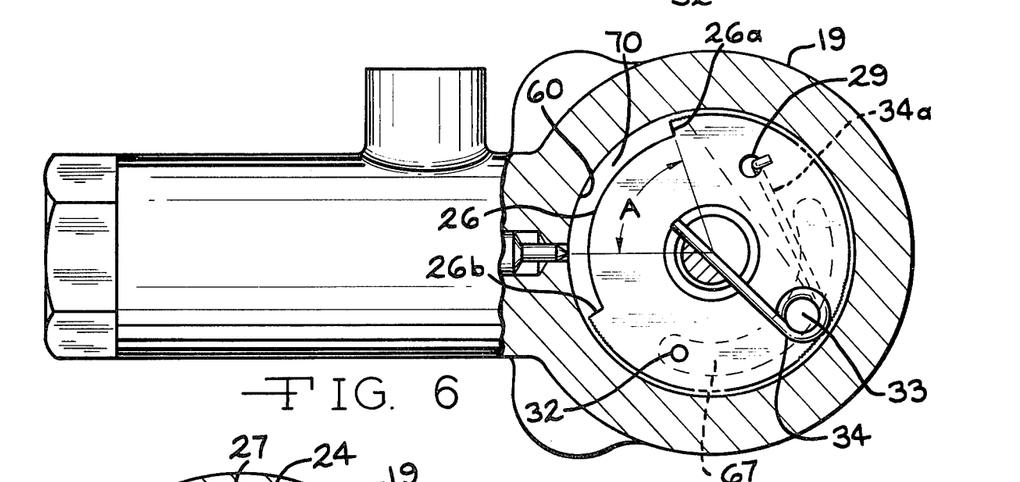
FIG. 6 is a partial cross-sectional view taken along line 6—6 in FIG. 4.
Figure 7:
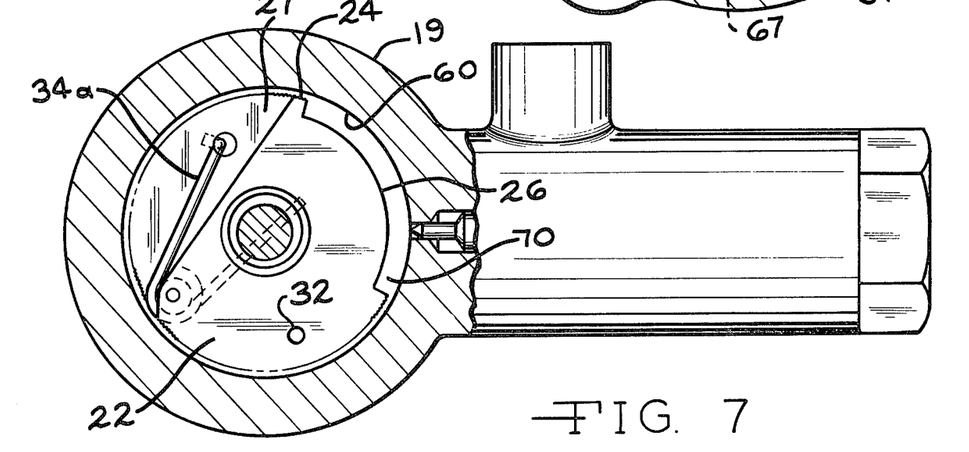
FIG. 7 is a partial cross-sectional view taken along line 7—7 in FIG. 4.
Figures 8, 9:
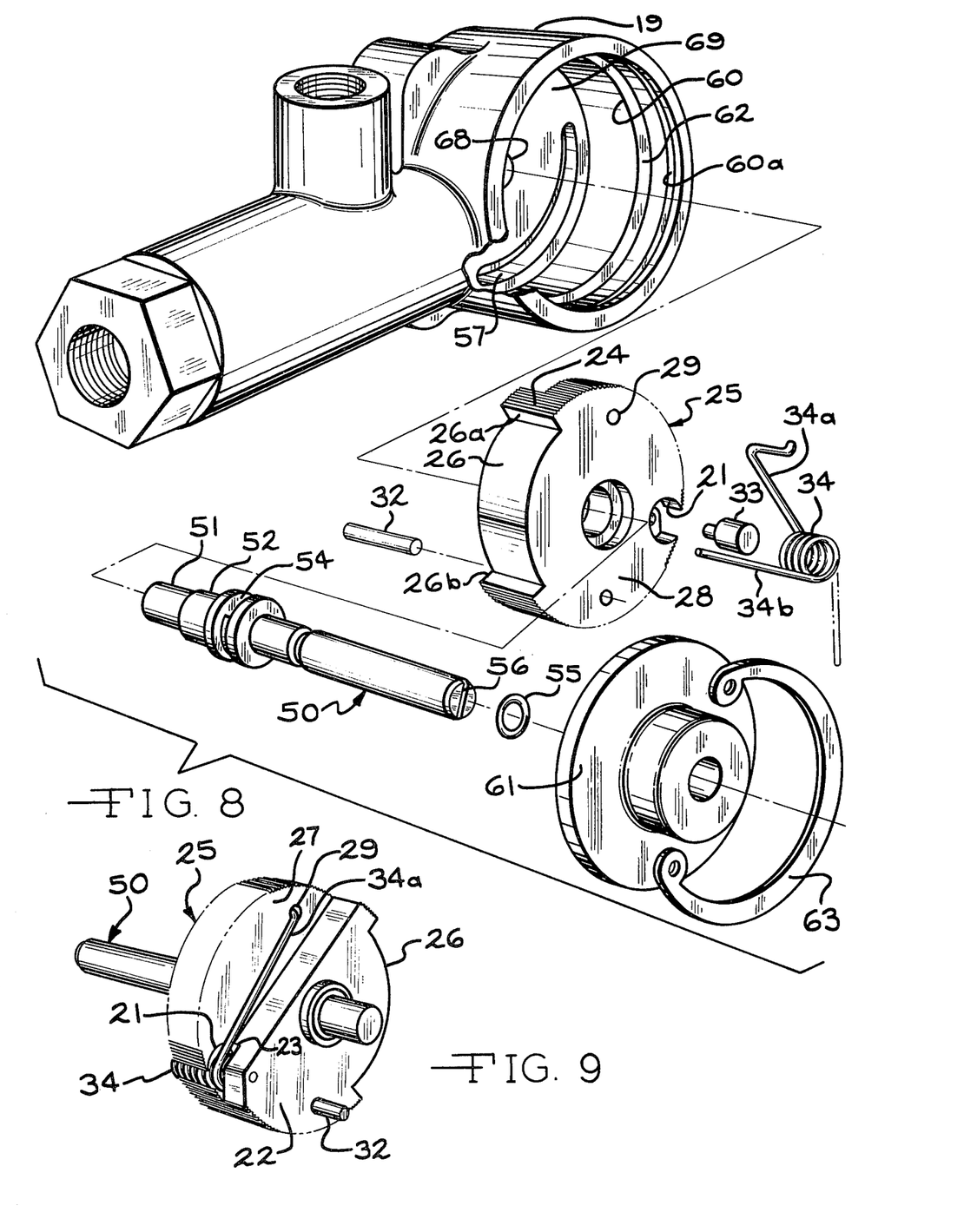
FIG. 8 is an exploded pictorial view showing the assembly of elements comprising the digital cam portion of my load sensing proportioning valve.
FIG. 9 is an isolated pictorial view of the digital cam rotated 180° from that shown in FIG. 8.

The opposite end of piston 40, includes valve head 43 which is less in diameter than that of bore 45b thus permitting the unrestricted flow of hydraulic fluid thereby. Piston 40 is further provided extension cap 41 having notch 42 therein. Piston 40 is normally biased to the left by action of spring 46 such that extension 41 is urged abuttingly against the end of bore 45b. Hydraulic fluid is thus permitted to enter inlet port R1, freely pass between piston 40 and elastomeric valve seat 44, past valve head 43, through notch 42 and exit through outlet port R2. Thus in the configuration as shown in FIG. 5 the fluid pressure at outlet port R2 will be equal to the fluid pressure at inlet port R1.

During brake application the above described fluid path through proportioning valve 16 remains open until the fluid pressure delivered at inlet port R1 attains a predetermined level. At this time valve head 43 will close against vale seat 44. The level of pressure at which this occurs is dependent upon the force of spring 46 as compared to the effective area of the valve piston 40, acted upon by inlet fluid pressure in a direction opposing the force of spring 46. This effective area is equal to the diameter D of piston 40 since the right hand end of piston 40 projecting into bore 45a is sealed off from the inlet fluid pressure by O-ring seal 47 while the inlet fluid pressure acts against all of the remaining portions of piston 40.

After valve head 43 closes against valve seat 44 and the fluid pressure at inlet port R1 is further increased, the increased pressure will act against piston 40 over an effective circular area having a diameter equal to the main sealing diameter of valve head 43 less the cross-sectional area of piston 40 extending into bore 45a. This produces a force acting upon piston 40 in the same direction as an assisting spring 46 to reopen valve head 43 so as to deliver at least a portion of the increased fluid pressure to outlet port R2. However, any increased fluid pressure delivered to outlet port R2 creates an opposing force upon piston 40. The opposing force tends to reclose valve head 43 against valve seat 44. The opposing forces tend to keep valve head 43 closely adjacent to valve seat 44 thereby restricting the flow of fluid from inlet port R1 to outlet port R2 creating a pressure at the outlet port R2 which increases at a lower rate than the pressure at inlet port R1. The ratio of the pressures is determined by the relationship of the effective areas previously referred to and hence the fluid pressure passing through proportioning valve 16 may be proportioned to follow a predetermined relationship.

During that portion of a brake application in which the applied pedal effort is reduced subsequent to a brake application of sufficient intensity to have moved piston 40 to the restricted flow position the forces tending to move piston 40 to the left are reduced and piston 40 translates to the right under the influence of the pressure at outlet port R2. As the piston 40 moves right valve head 43 is permitted to slide within the inner peripheral surface of valve seat 41, thereby increasing the available volume for the fluid at the rear brake cylinders 15L and 15R and accomplishing a reduction in pressure at outlet port R2. The pressure at outlet port R2 can never be greater than the pressure at inlet port R1 because valve seat 44 also acts as a fluid check valve permitting the flow of fluid from port R2 and into bore 45.

For a more detailed description relating to proportioning valve operation and the design of particular proportioning valve elements refer to U.S. Pat. No. 3,423,936 issued to William Stelzer on Jan. 28, 1969.

Figure 4:
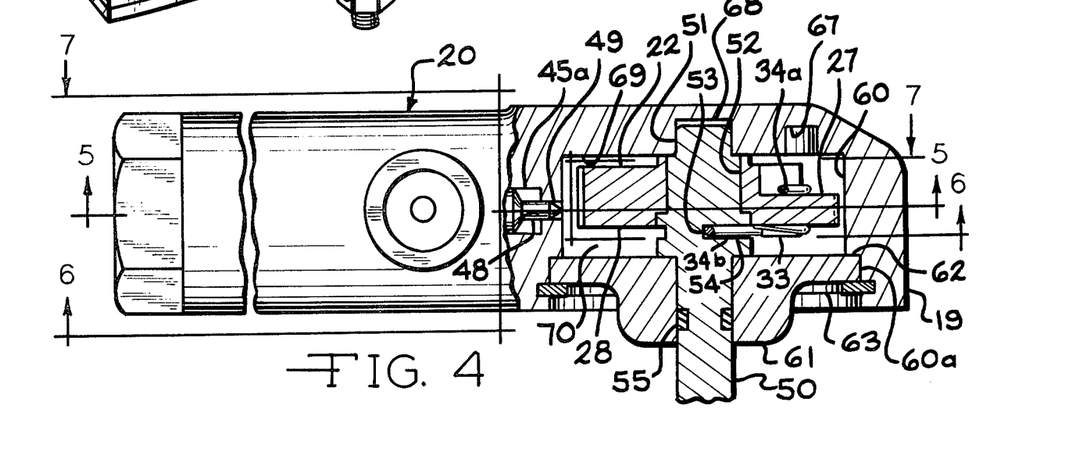
FIG. 4 is a partial cross-sectional view of the load sensing proportioning valve used in the braking system illustrated in FIG. 1.

FIGS. 4 through 9 are to be referred to for the following description of the digital cam 25, its construction and operation. LSPV housing 19 is provided with a two step bore 60. Floor 69 of bore 60 contains recessed therein semicircular slot 67 and journal recess 68. Cam driveshaft 50 is supported and retained as shown in FIG. 4. Journal 51 of driveshaft 50 is rotationally received within journal recess 68. Shaft 50 extends generally normal to bore floor 69 passing through and rotationally supported by end cap 61. End cap 61 is snugly retained within bore 60a and against shoulder 62 by action of snap ring 63. O-ring 55 is provided to seal the digital cam chamber 70 from the entrance of any contamination thereto. Cam driveshaft 50 protrudes externally of end cap 61 sufficiently to permit rigid engagement thereof by linkage 30 (see FIG. 3). Thus driveshaft 50 is caused to rotate through the same angular displacement as that of linkage 30.

Digital cam 25 is rotationally supported on cam journal 52 of driveshaft 50 such that cam 25 may rotate relative to driveshaft 50. Cam 25 is provided with a peripheral recess 26 and axial directed knurls 24 over at least the working peripheral portion of cam 25. The working portion of cam 25 will become apparent as the function and operation are further described hereinafter. Pin 32 projects axially from cam 25 into and slidably engaging slot 67 in bore floor 69 thereby limiting the angular rotation of cam 25 to that are inscribed by slot 67. The inboard side 22 of cam 25 is milled providing inboard facing stepped surface 27. Circular recess 21 extends axially through cam 25 from the outboard surface 28 and slightly past the inboard facing stepped surface 27 thereby providing passage way 23 between outboard surface 28 and inboard surface 27. Mandrel 33 is axially positioned within circular recess 21 extending outboard and slightly past outboard surface 28. Torsion spring 34 is seated about mandrel 33 the helical portion thereof being seated within circular recess 21 such that inboard leg 34a extends through passage way 23 in juxtaposed relation with inboard facing stepped surface 27 and engages spring retention hole 29. Outboard spring leg 34b extends in juxtaposed relation with outboard surface 28 of cam 25 extending into slot 54 of driveshaft 50 and engaging the flat camming surface 53. In their normal assembled state as hereinabove described and shown in FIG. 6, torsion spring legs 34a and 34b are spring loaded so as to apply an angularly outward force upon spring retention hole 29 and the flat camming surface 53 of driveshaft 50. Slot 56 is provided at the external and outboard end of cam driveshaft 50 to permit external adjustment.

In operation cam 25 is caused to rotate with cam driveshaft 50 by reason of torsion spring 34 applying spring force upon camming surface 53 of shaft 50. However should cam 25 be restricted from rotating because of interference between pin 32 and slot 67 or because of interference between cam 25 and pin 48 on valve piston 40, cam driveshaft 50 may however, rotate relative to cam 25 by further compressing torsion spring 34. Thus a spring drive mechanism is provided between cam driveshaft 50 and digital cam 25 which allows for over travel of shaft 50 when rotation of cam 25 is otherwise restricted.

FIGS. 3, 5 through 7 and 10 depict the configuration of LSPV 20 under conditions of light vehicle loading. The vehicle frame 35 is riding relatively high with respect to suspended axle 31. Thus linkage 30 positions digital cam 25 such that peripheral recess 26 permits pin 48 of piston 40 to axially translate in and out of digital cam chamber 70. Proportioning valve 16 is permitted to freely function resulting in a master cylinder pressure to rear brake pressure relationship as shown by the curve identified as "EMPTY" in FIG. 2.

Figures 12, 13:
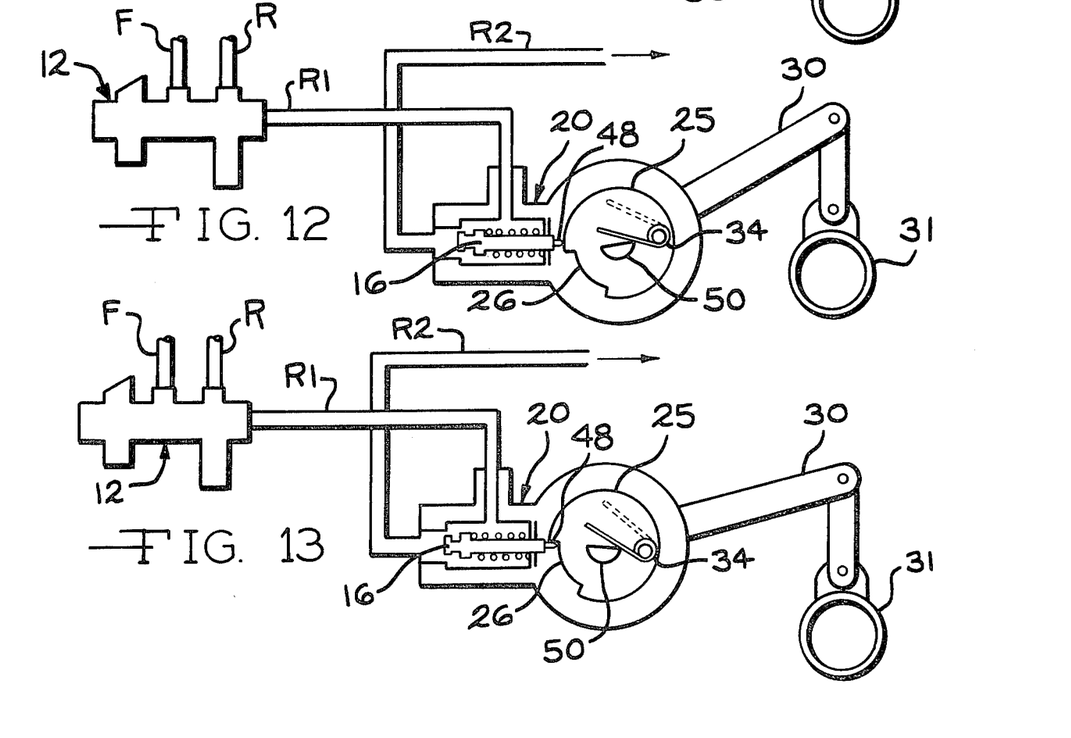
FIGS. 12 and 13 present schematic illustrations of load sensing proportioning valve configurations accommodating over-rotation of the digital cam driveshaft.

So long as the vehicle is lightly loaded proportioning valve 16 is functional. Peripheral slot 26 accommodates operation of valve 16. However, should valve piston pin 48 protrude into cam chamber 70 as a result of vehicle braking and the vehicle encounter an extreme road condition causing cam driveshaft 50 to momentarily, over rotate from excessive compression of the vehicle suspension system, cam 25 will momentarily engage valve piston pin 48 stopping the cam's counterclockwise rotation. However, cam driveshaft 50 is permitted to continue its counterclockwise rotation by compressing torsion spring 34. Such a condition is illustrated in FIG. 13.

Figures 10, 11:
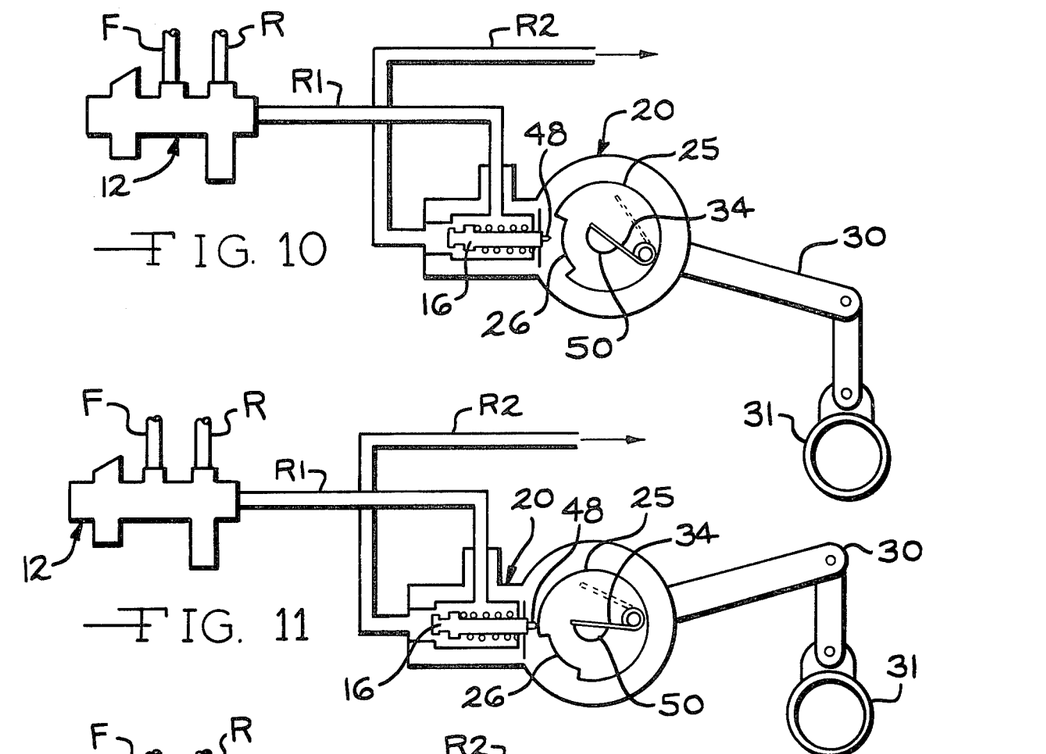
FIG. 10 is a schematic illustration of the load sensing proportioning valve configuration when the vehicle is lightly loaded.
FIG. 11 is a schematic illustration of the load sensing proportioning valve configuration when the vehicle is heavily loaded.

When the vehicle is loaded heavy the suspension system is compressed such that the vertical separation between frame 35 and axle 31 is reduced. Linkage 30 assumes a configuration as depicted in FIG. 11 thereby rotating digital cam 25 counterclockwise as shown. In this configuration the outermost periphery of cam 25 is rotated into a position that disables proportioning valve 16 by preventing the free translation piston 40. Thus in the loaded condition, as illustrated in FIG. 11, the master cylinder pressure to rear brake pressure relationship is as shown by the curve identified as "LOADED" in FIG. 2. So long as the vehicle is in the loaded condition the outer periphery of cam 25 will remain in the valve piston disabling configuration as illustrated in FIGS. 11 and 12. In this configuration and when the applied braking load is such that valve piston 40 attempts to translate to the right valve piston pin 48 buts against cam 25 and engages the axial knurls 24 on the outer periphery of cam 25. Thus cam 25 is restricted from freely rotating. Any further rotation of cam driveshaft 50 resulting from road induced vacillations of axle 31 will be accommodated by compression of torsion spring 34 as illustrated in FIG. 12.

The angle A (FIG. 6) between the pin 48 centerline and digital cam step 26a determines the vehicle load condition at which proportioning valve 16 is disabled therefore it is necessary that this angle be accurately fixed. Angle A is determined for an unloaded vehicle and represents that angle through which driveshaft 50 will rotate as the vehicle is loaded to that mid-load condition at which it is desired to change from the "EMPTY" curve to the "LOADED" curve as shown in FIG. 2. Step 26b is located so as not to interfere with the operation of proportioning valve 16; pin 32 and slot 67 may also be configured so as to limit the clockwise rotation of cam 25 thereby preventing step 26b interfering with the operation of proportioning valve 16.

Figure 14:
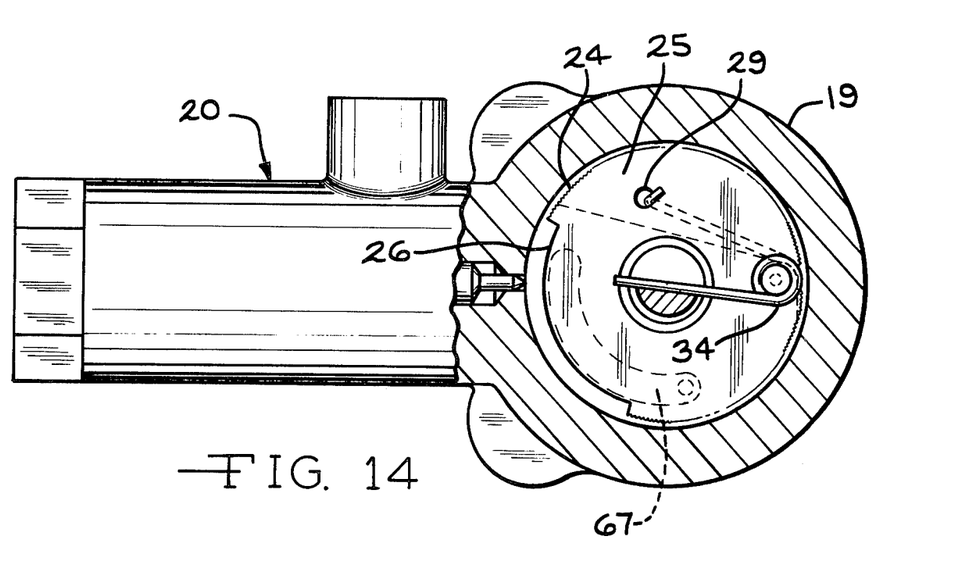
FIG. 14 presents a partial cross-sectional view of the load sensing proportioning valve, similar to that of FIG. 6, wherein the digital cam mechanism is configured activation by clockwise rotation of the digital cam driveshaft.

The LSPV as illustrated in FIGS. 1 through 13 accommodate counterclockwise rotation of cam driveshaft 50 upon compression of the vehicle suspension system. However, the LSPV may be easily adapted to accommodate clockwise rotation as is illustrated in FIG. 14. By relocation of slot 67 as shown in FIG. 14 the mechanism is adapted for clockwise rotation.

While the invention has been described herein with considerable particularity, it will be understood that the scope thereof is to be determined by the appended claims.

I claim:

1. In a pressure regulating valve for a vehicle fluidic brake system wherein said valve includes operable valve means for regulating the input to output pressure relationship and positionable cam means communicating with said operable valve means whereby the position of said cam means in relation to said operable valve means acts to selectively restrict the function of said operable valve means thereby modifying the input to output pressure relationship, the improvement wherein said positionable cam means includes rotatable shaft means, coupling means between said cam means and said rotatable shaft means for driving said cam means in response to said rotatable shaft means, said coupling means including lost motion means whereby said rotatable shaft means functions independent of said cam means whenever said cam means exhibits a predetermined resistive force.

2. In a pressure regulating valve for a vehicle fluidic brake system wherein said valve includes an operable element for regulating the input to output pressure relationship and means for selectively restricting the function of said operable element in response to a sensed vehicle operating condition thereby modifying said input to output pressure relationship, the improvement wherein said means for selectively restricting said operable element comprises rotatable shaft means, said shaft means including a D-shaped axially extending portion thereof, circular cam means coaxial with and independently rotatable about said rotatable shaft means, and coupling means including a torsional spring having one leg thereof secured to said circular cam means and the other leg thereof drivingly engaging the flat surface of said D-shaped portion of said rotatable shaft means whereby said rotatable shaft means will rotate independent of and relative to said circular cam means whenever the torque of said rotatable shaft means is sufficient to cause said torsion spring to yield.

3. A proportioning valve for a vehicle hydraulic brake system having a lock out mechanism whereby said valve may be selectively rendered inoperative for given vehicle load conditions comprising:
valve means including piston means responsive to hydraulic pressure for operating said valve means;
a rotatable shaft having a D-shaped axially extending portion thereof;
rotatable cam means having a cam profile communicates with said piston means, said rotatable cam means being coaxial with and rotatable about said rotatable shaft;
coupling means between said rotatable shaft and said rotatable cam means said coupling means including a torsional spring having one leg thereof secured to said rotatable cam means and the other leg thereof drivingly engaging the flat surface of said D-shaped portion of said rotatable shaft whereby said rotatable shaft will rotate independent of and relative to said rotatable cam means whenever the torque of said rotatable shaft is sufficient to cause said torsion spring to yield.

4. A proportioning valve for a vehicle hydraulic brake system having a valve locking mechanism whereby said valve may be rendered inoperative in an open bypass configuration under selected vehicle load conditions comprising:
a housing having a first bore and a second bore, the axes of said bores intersecting each other at a right angle, said first bore having therein proportioning valve means including piston means axially extending therethrough and extending into said second bore;
rotatable shaft means coaxial with and extending axially through said second bore, said rotatable shaft means including a D-shaped axially extending portion thereof;
circular cam means coaxial with said second bore axis and extending radially outward from said rotatable shaft means, said circular cam means including a cam profile communicating with said proportioning valve piston means, said cam profile configured to impede movement of said piston means when said cam means is rotated to a given angular position thereby constraining said valve in an open bypass configuration;
coupling means between said rotatable shaft means and said circular cam means, said coupling means including a torsional spring having one leg thereof secured to said circular cam means and the other leg thereof drivingly engaging the flat surface of said D-shaped portion of said rotatable shaft means whereby said rotatable shaft means will rotate independent of and relative to said rotatable cam means whenever the torque of said rotatable shaft means is sufficient to cause said torsion spring to yield;
means for rotating said rotatable shaft means in response to vehicle load conditions.

5. A proportioning valve for a vehicle hydraulic brake system having a lock out mechanism whereby said valve may be selectively rendered inoperative for given vehicle load conditions comprising:
valve means including piston means responsive to hydraulic pressure for operating said valve means;
rotatable cam means having a cam profile communicating with said piston means, a rotatable shaft, coupling means between said cam and said shaft whereby rotation of said shaft effects rotation of said cam means, said rotatable cam means including stop means whereby the angle of rotation of said cam means is limited to a predetermined arc, said coupling means including resilient means permitting said rotatable shaft to rotate through an angle of rotation greater than that of said rotatable cam, said cam profile configured to impede movement of said piston means when said cam means is rotated to a given angular position thereby locking said valve means in an inoperative configuration, means for rotating said rotatable shaft in response to vehicle load conditions.

6. A proportioning valve for a vehicle hydraulic brake system having a valve locking mechanism whereby said valve may be rendered inoperative in an open bypass configuration under selected vehicle load conditions comprising:

a housing having a first bore and a second bore the axes of said bores intersecting each other at a right angle, said first bore having therein proportioning valve means including piston means axially extending therethrough and extending into said second bore;

rotatable shaft means coaxial with and extending axially through said second bore, circular cam means coaxial with said second bore axis extending radially outward from said rotatable shaft means, said circular cam means including stop means whereby the angle of rotation of said cam means is limited to a predetermined angle, coupling means between said rotatable shaft and said circular cam means whereby rotation of said shaft effects rotation of said circular cam, said coupling means including resilient means thereby permitting said rotatable shaft to rotate through an angle of rotation greater than that of said rotatable cam, said circular cam means including a cam profile communicating with said proportioning valve piston means, said cam profile configured to impede movement of said piston means when said cam means is rotated to a given angular position thereby constraining said valve in an open bypass configuration, means for rotating said rotatable shaft in response to vehicle load conditions.

* * * * *